April 14, 1942.  M. G. CROSBY  2,279,661
WAVE CONTROL AND CONTROL CIRCUIT
Original Filed May 25, 1938   3 Sheets-Sheet 1
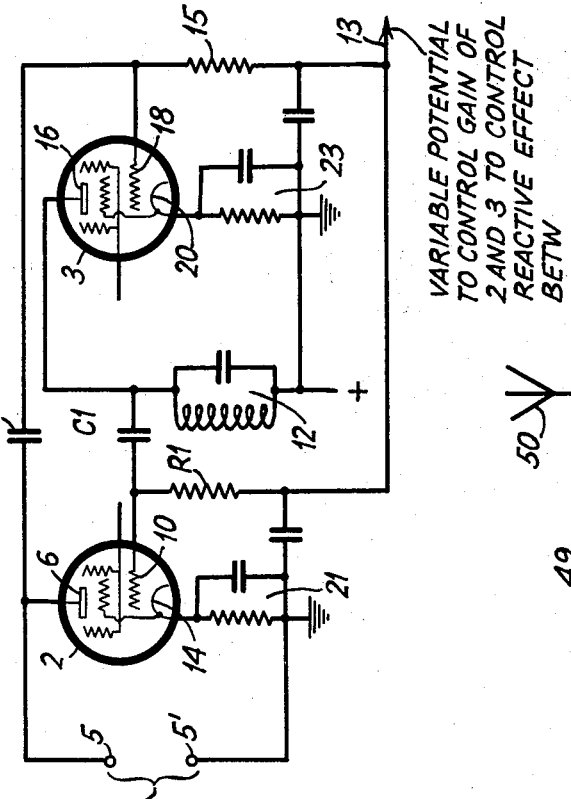
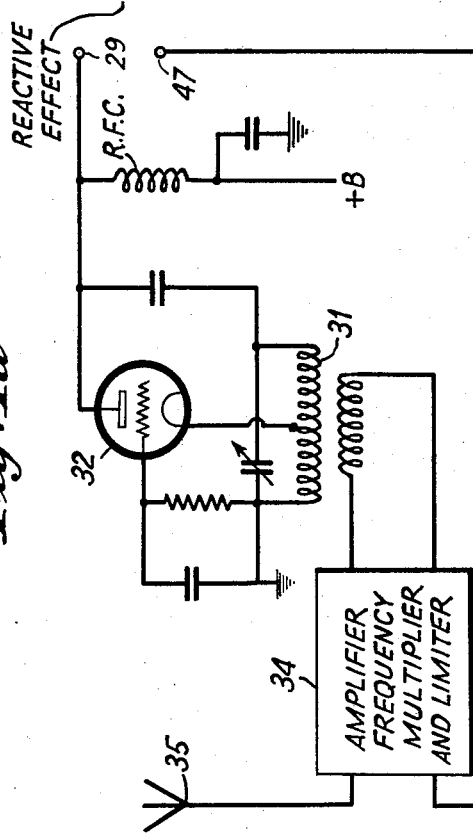
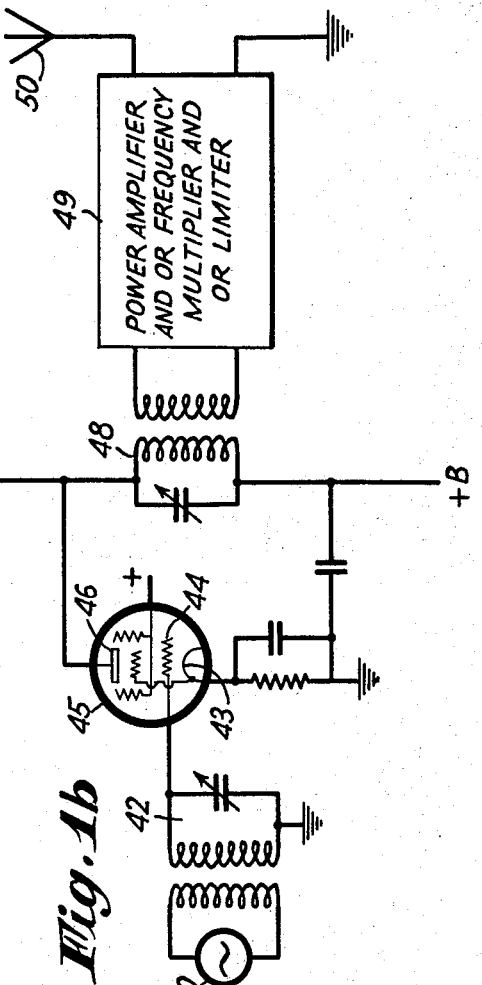
INVENTOR
MURRAY G. CROSBY
BY
ATTORNEY April 14, 1942.   M. G. CROSBY   2,279,661
WAVE CONTROL AND CONTROL CIRCUIT
Original Filed May 25, 1938   3 Sheets-Sheet 2
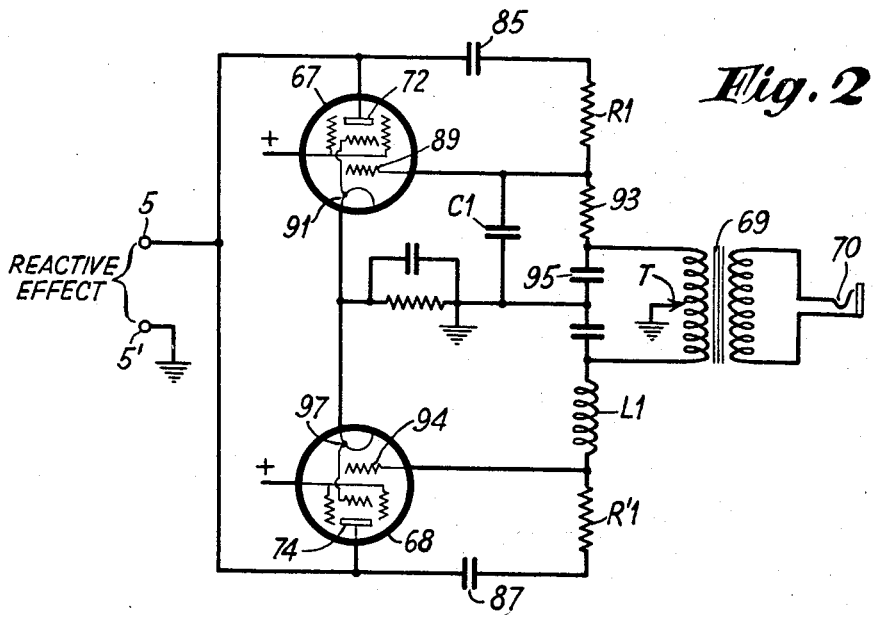
Fig. 2
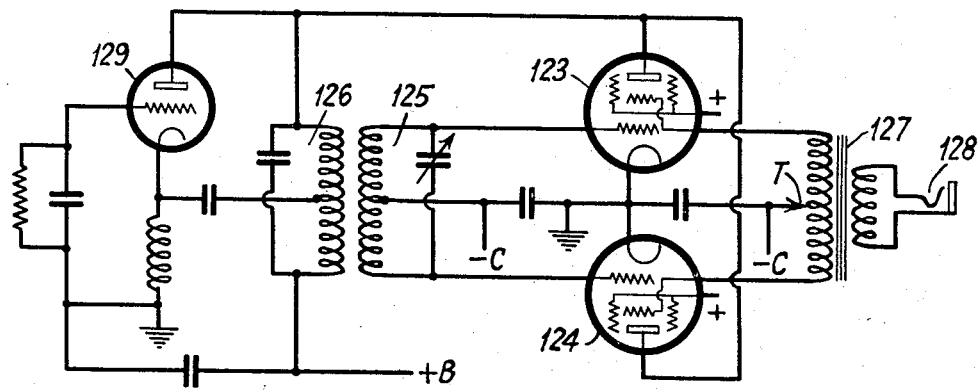
Fig. 3
Fig. 6
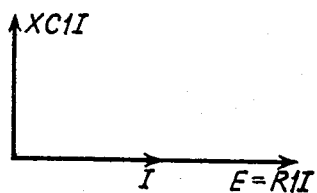
Fig. 7
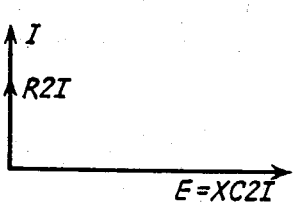
INVENTOR
MURRAY G. CROSBY
BY
ATTORNEY April 14, 1942.   M. G. CROSBY   2,279,661
WAVE CONTROL AND CONTROL CIRCUIT
Original Filed May 25, 1938   3 Sheets-Sheet 3
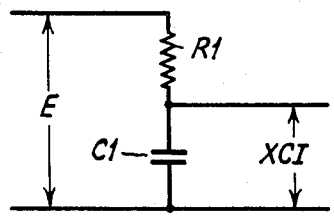
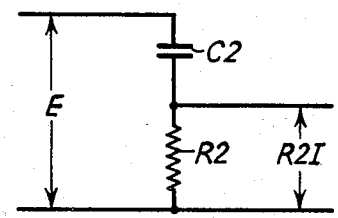
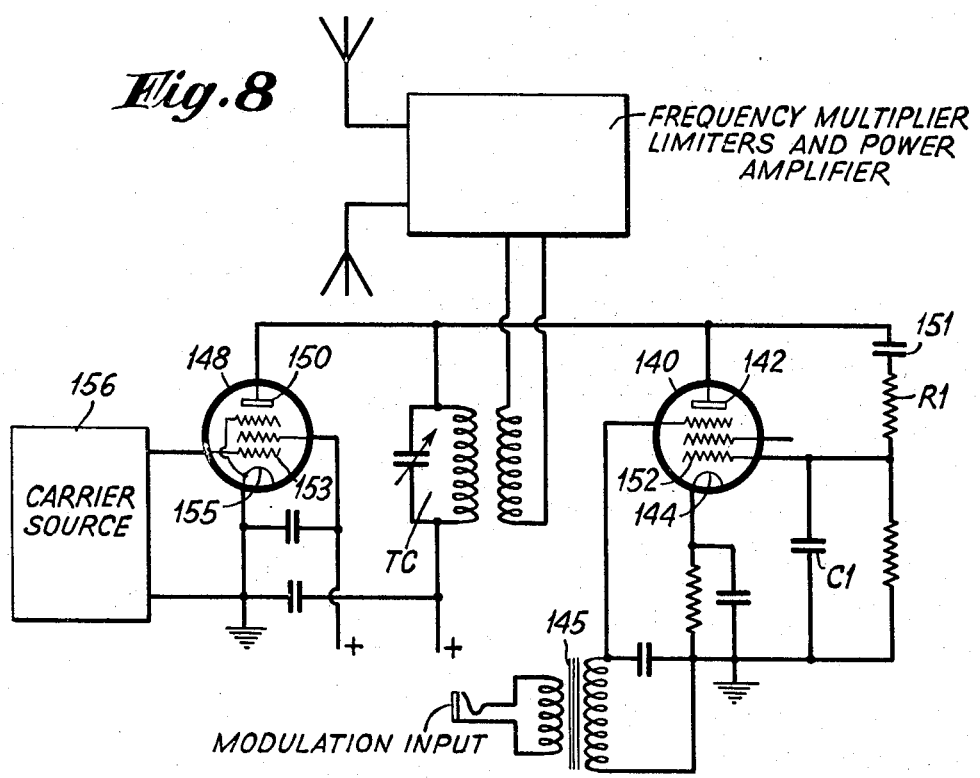
INVENTOR
MURRAY G. CROSBY
BY H. G. Grover
ATTORNEY Patented Apr. 14, 1942

2,279,661

UNITED STATES PATENT OFFICE 2,279,661

WAVE CONTROL AND CONTROL CIRCUIT

Murray G. Crosby, Riverhead, N. Y., assignor to Radio Corporation of America, a corporation of Delaware Original application May 25, 1938, Serial No. 209,919. Divided and this application March 9, 1940, Serial No. 323,078

7 Claims. (Cl. 179—171.5)

This is a division of my application Serial No. 209,919, filed May 25, 1938, now U. S. Patent #2,250,095, dated July 22, 1941. This application concerns a new and improved voltage control means of the reactance tube type and the application of the same to new and improved signalling circuits such as frequency and phase modulators. The novel reactance tubes are in accordance with my invention used to vary the tuning of any circuit such as for example, an oscillator or amplifier tuned circuit. In my invention I apply the principles of push-pull and cascade amplification to reactance tubes known in the art so as to provide greater and more linear degrees of reactance variation.

Reactance tubes as referred to above have been disclosed in Travis' United States applications Serial #4,793 filed February 4, 1935, and Serial #19,563, filed May 3, 1935. Improvements on the reactance tube referred to in general above have also been disclosed in my United States applications Serial #165,056 filed September 22, 1937, now Patent #2,156,374 dated May 2, 1939, and Serial #167,344 filed October 5, 1937, now Patent #2,156,375 dated May 2, 1939.

In describing my invention reference will be made to the attached drawings wherein;

Fig. 1 illustrates a novel reactance tube system including means for amplifying one of the voltages supplied in phase quadrature to the reactance tube electrodes to thereby increase the reactive effect of the tube. The phase displacing circuit for producing the substantially phase quadrature potentials used to obtain the reactive effect is placed in the coupling circuit between the reactance tube and the amplifying reactance tube. In this modification controlling voltages from any source are supplied to electrodes of the amplifying reactance tube and the reactance tube to thereby control through a greater range the reactive effects;

Figs. 1a and 1b are diagrammatic showings of an oscillator and a wave amplifier which may be controlled by the reactive effect produced in the reactance circuit of Fig. 1 to produce frequency and phase modulation respectively;

Fig. 2 is a modified reactance circuit wherein a pair of reactance tubes have their electrodes supplied with controlling potentials in push-pull and their output electrodes in parallel to thereby increase the reactive effect and at the same time improve the linearity of said effects with respect to the controlling potentials;

Fig. 3 is a modification of the arrangement of Fig. 2;

Figs. 4 and 5 are phase shifting reactances utilized in explaining the manner in which the substantially phase quadrature voltages are obtained on the electrodes of the reactance tube;

Figs. 6 and 7 are vector diagrams used in explaining the circuits of Figs. 4 and 5; while Fig. 8 is a phase modulator circuit utilizing a reactance tube in a novel manner to control the phase of wave energy being amplified in accordance with signalling voltages.

In the circuit of Fig. 1 cascade amplification is utilized to amplify the phase shifted substantially phase quadrature feedback voltage of the reactance tube. Ordinarily the plate alternating voltage of the reactance tube is fed back to the grid by means of a phase shifter which imparts a 90° phase shift to the voltage. In this known system, however, the voltages fed back are not amplified. Such a system would be as if the tube 3 of Fig. 1 was omitted and the phase quadrature voltages supplied from the anode 6 of tube 2 directly to the phase shifting circuit $C_1R_1$ and from the adjacent terminals of $C_1R_1$ directly to the grid 10 of tube 2. Under these circumstances, assume that voltages from any circuit to be controlled is supplied to the terminal of lead 5 and from lead 5 to the anode 6 of tube 2 and from anode 6 to the right-hand terminal of $C_1$ (tube 18, circuit 12, and condenser 11 omitted). The value of resistance $R_1$ is made small as compared to the reactance of the condenser $C_1$ so that the current through the circuit is largely reactive and leads the voltage by about 90°. Since the voltage drop through $R_1$ is in phase with the current the phase quadrature relation between the radio frequency potentials on 6 and 10 necessary for the reactive effect is obtained. The tube reactance, that is, the reactance between electrodes 6 and 14 of tube 2 connected to any radio frequency circuit may be utilized to control the reactance of the said circuit. This reactive effect which may be considered inductive or capacitive, is in turn controlled by the potentials supplied to the controlling potential lead 13 and from lead 13 to control grid 10.

In my improved circuit I amplify one of the voltages supplied substantially in phase quadrature from anode 6 to control electrode 10.

In the circuit of Fig. 1 the alternating current voltage supplied from the circuit, the reactance of which is to be controlled is supplied to anode 6 from lead 5 and to coupling condenser 11 and from condenser 11 to the control grid electrode 18 of an electron discharge tube 3, amplified in said tube 3 and supplied from the anode 16 thereof to tuned circuit 12 and fed from the high voltage end of tuned circuit 12 to the phase shifting and coupling condenser $C_1$ and from the latter condenser to the control grid 10 of reactance tube 2.

The cathodes 14 and 20 of tubes 2 and 3 are connected to ground by bias resistor and bypass condenser units 21 and 23 respectively. Grid bias resistor $R_1$ serves also as a phase shifting resistance. Operating potentials are supplied to the tube electrodes as desired in the usual fashion from sources of potential not shown.

$R_1C_1$ constitutes the phase shifting circuit which shifts the phase of the amplified alternating voltage supplied from the anode 16 of tube 3 and applies it to the grid 10 of amplifier tube 2. This phase shifting circuit may be replaced by a tuned transformer or any other phase shifting circuit. Grid leak 15 and resistor $R_1$ are used to apply voltage from lead 13 connected with any control voltage source to the control grids 10, 18 of tubes 2 and 3, respectively to thereby vary the overall gain of both of these tubes and consequently vary the effective reactance at the plate 6 of tube 2. When controlling potentials such as modulating potentials are applied to the lead 13 they produce reactive effects which are supplied between 5 and ground or cathode 14.

This reactive effect may be utilized as illustrated in Fig. 1a to frequency modulate an oscillator. For example, by connecting lead 5 to lead 29 this effect may be used to control the reactance of a tuned circuit 31 of an oscillator system including tube 32 to thereby frequency modulate at signal frequency the oscillations produced in the tube and system and supplied from 31 to a radio frequency amplifier, frequency multiplier, etc., in 34. Frequency modulated energy from 34 may be supplied to any load such as for example, an aerial 35.

Moreover, the reactive effect produced as described above between anode 6 and cathode 14 may be applied to an arrangement such as shown in Fig. 1b to produce phase modulated oscillations. In Fig. 1b wave energy from any source 40 is supplied to tuned circuit 42 and from circuit 42 to the control grid 44 of an electron discharge tube 45 and from the amplified energy is supplied from the anode 46 of 45 by way of tuned circuit 48 to a power amplifier and/or frequency multiplier and/or limiter 49 and from 49 to any load circuit such as for example, an aerial 50. Now, if we connect the anode 46 as to the lead 47 and connect the said lead 47 to the lead 5 and to the high voltage end of tuned circuit 48 and complete the reactance circuit by connecting the cathode 14 of tube 2 to the cathode 43 of tube 45, the reactive effects are applied to the tuned circuit 48 of the electron discharge device 45. The reactive effects modify the reactance of circuit 48 and thereby vary the phase of the wave energy supplied by tube 45 to unit 49 in accordance with the controlling potentials supplied to lead 13. These controlling potentials may represent signals.

The circuit of Fig. 1 has for a primary advantage, the fact that the over-all gain of the reactance tube 2 is increased due to the cascade amplification supplied by tubes 2 and 3 operating together. Since the amount of variable reactance obtainable from a reactance tube is dependent upon the gain or amplification of that tube, an increase of that gain will increase the amount of variable reactance available. A further advantage of this type of reactance tube circuit lies in the fact that the phase shifting circuit $R_1C_1$ may be made such as to very lightly load the tuned circuit which is being controlled. For example, if the reactance tube circuit of Fig. 1 is connected at 5 to lead 29 of Fig. 1a, the reactance tube circuit places a light load on the oscillator circuit, including tube 32 and tuned circuit 31 and therefore operating difficulties such as maintenance of substantially constant mean oscillating frequency, etc., are materially reduced. With a single reactance tube as known in the prior art in order to produce high degrees of reactive variation, resistance $R_1$ must be lowered to values which appreciably load the controlled or modulated tuned circuit such as for example the tuned circuits 31 of Fig. 1a and 48 of Fig. 1b.

In my novel cascaded amplification reactance system, the effective loading produced by the reactance tube may be made very light so that the variable reactance will have a high effective circuit Q. Hence, for phase modulation purposes as illustrated in Figs. 1 and 1b less reactive variation will be required to produce a given amount of phase modulation than would be required if the Q of the reactance tube were lower.

Modulations or controlling potentials are applied to the control grids of either one of the tubes 2 and 3, singly if desired or as shown to both of these tubes or the modulating or controlling potentials from 13 may be applied to other electrodes of one or both of the tubes 2 and 3.

Obviously, my novel reactance circuit is particularly applicable to variable tuning systems wherein the frequency of a receiver is automatically controlled in accordance with controlling potentials obtained in frequency discriminating circuits or otherwise. In this case, terminal 5 of the reactance tube system of Fig. 1, is connected to the tuned circuit of the receiver heterodyne oscillator and as before, the automatic frequency control potentials are applied to the load 13. More details as to the application of a reactance tube of any type and in particular of the reactance tube of the present invention to automatic frequency control systems have been described in detail in my United States applications Serial #16,591 filed April 16, 1935, now Patent #2,123,716 dated July 12, 1938, and Serial #171,820 filed October 30, 1937, now Patent #2,163,747 dated June 27, 1939, and in my United States Patent #2,065,565 dated December 29, 1936; #2,042,831 dated June 2, 1936; #2,076,175 dated April 6, 1937; and #2,085,008 dated June 29, 1937.

In the novel circuit of Fig. 2, I apply the principles of push-pull to the reactance tubes 67, 68 for the purpose of producing large reactive effects which more linearly follow the controlling potentials supplied from any source to a jack 70 and a transformer 69. In this arrangement the lead 5 is again adapted to be connected to any tuning circuit, the frequency of which is to be controlled, and voltages from which are supplied to the anodes 72, 74 of tubes 67, 68 respectively. These voltages are also supplied to coupling condensers 85, 87 and from said coupling condensers to phase shifting resistances $R_1R'_1$ respectively. The voltage from $R_1$ is impressed on the control grid 89 of tube 67 and this phase shifting circuit is completed by connecting a capacitive reactance $C_1$ to the cathode 91 of tube 67. The controlling potential circuit to grid 89 is completed through a resistor 93 connected to one end of the secondary winding of transformer 69. Resistance 93 also completes the direct current circuit between the cathode 91 and controlling electrode 89 of tube 67 since the electrical center of the secondary winding of 69 is connected to said cathode 91. The voltages supplied by 87 to $R'_1$ are supplied therefrom to the control electrode 94 of tube 68 and the phase shifting circuit is completed by an inductive reactance $L_1$ connecting control grid 94 through one of a pair of bypassing condensers 95 to the cathode 97 of tube 68. It is noted that the inductance $L_1$ also has a double purpose since it completes the direct current circuit between the control grid 94 and cathode 97.

Tube 67 has its plate voltage fed back to its grid by means of a phase shifting circuit $R_1C_1$ and coupling condenser 85, while tube 68 has its feedback voltage applied to its grid by means of phase shifting circuits $R'_1L_1$ and coupling condenser 87. By virtue of the fact that one of the tubes obtains its feedback voltage from a capacitive reactance drop and the other obtains its feedback voltage from an inductive reactive drop, the effective reactance variable at the plate circuits of the two tubes will be opposite for equi-directional element voltage variations. As will be noted, the controlling or modulating potentials are supplied by means of a push-pull transformer to the controlling electrodes 89 and 94 so that the tubes are controlled or modulated in phase displaced relation with respect to each other.

When the potential supplied to the control grid 89 goes up the capacity reactance effect is increased so that the reactive effect of tube 67 is increased. Simultaneously, the control potential supplied to the grid 94 goes down and this increases the inductive reactance of tube 94. In other words, the capacity and inductive effects of the tube 67 vary in phase as a consequence of the phase displaced control thereof.

The reactive effects are added in the outputs which are in parallel and may be supplied from the lead 5 to any circuit to be controlled. For instance, lead 5 may be connected to leads 29 or 47 of the modifications shown in Figs. 1a and 1b to produce frequency or phase modulation respectively in the same manner as described in connection with Figs. 1a and 1b.

The push-pull reactance tube circuit described above produces a larger and more linear reactance variation which will allow of a greater degree of control of the modulation of the potentials supplied to the reactance tube, for example, to the jack 70 and transformer 69 of Figure 2. Consequently, a greater and more faithful degree of frequency or phase modulation can be produced.

The circuit of Fig. 3 employs push-pull principles and utilizes a phase shifting circuit which is more efficient than the type using a combination of a resistance and a reactance. The circuit is shown as a frequency modulator modulating the frequency of tuned circuit 126 of grounded-grid oscillator 129. Tuned circuit 125 is coupled to the oscillator circuit 126 and, by virtue of the fact that the coupling is inductive, a 90° phase rotation is produced at the resonant frequency of the tuned circuits. That is to say, the phase of the voltage across tuned circuit 126 will be shifted 90° when it appears across tuned circuit 125. This phase shift is inherent in a tuned transformer in which the coupling coefficient is less than unity. By mid-tapping tuned circuit 125 reactance tube 123 is fed a voltage 180° out of phase with that fed to reactance tube 124. Consequently, the variable reactance of tube 123 is opposite in reactance polarity to that of tube 124 for equi-directional element voltage changes. This requires the application of the modulating potentials differentially by means of transformer 127. The modulating potentials are applied at jack 128. The particular circuit of Fig. 3 utilizes suppressor-grid modulation. However, any other type of modulation such as the grid modulation of the previously mentioned circuits or plate and screen modulation may be used. The advantage of the circuit of Fig. 3 lies in the fact that the phase shifter is highly efficient and may be adjusted so that the reactance tube has a minimum amount of loading effect on the circuit to be modulated. This circuit may be utilized for phase modulation or for automatic frequency control in the same manner as the previously described circuits.

Obviously the tubes of Figs. 2 and 3 which are in parallel as to the reactive effect may also be modulated or controlled in the same direction by the controlling or modulating potentials. Where the tubes are controlled differentially as in Figs. 2 and 3 the amount of control or modulation of each tube may be adjusted by moving the taps T on the secondaries of transformers 69 and 127 off center. Then one tube is modulated over a greater range than the other. In this manner the linearity of the produced reactive effect may be improved in some cases.

In Fig. 4, I have shown a phase shifting circuit such as for example, used in Figure 2. Fig. 6 is a vector diagram of the voltages obtained by this phase shifting circuit. In Fig. 4 E is the applied voltage such as for example, the voltage supplied from any tuned circuit to anode 72 and cathode 91 of tube 67 of Fig. 2. $XC_1$ is the reactance of $C_1$ and is made low as compared to the resistance of $R_1$ with respect to the frequency of the voltages involved so that the current through this circuit is largely resistive and is in phase with the voltage as shown by the arrowhead indicated by I in Fig. 6. The reactance drop across condenser $C_1$ will be 90° out of phase with the current so that $XC_1I$ is 90° out of phase with E as shown.

Fig. 5 shows the phase shifter circuit for an arrangement such as shown at $C_1R_1$ in Fig. 1; Fig. 7 is the vector diagram illustrating the manner in which the phase shift is obtained in this latter circuit. The reactance of condenser $C_2$ is made large as compared with the resistance of $R_2$ with respect to the frequency of the voltages involved so that the current through this circuit is largely determined by the condenser. Since the current is capacitively reactive it leads the voltage E by 90° as shown in Fig. 7. The drop across $R_2$ will be in phase with the current through this circuit. Consequently, the drop across $R_2$ is 90° out of phase with the voltage E and the required phase shift is effected.

Of course, I do not limit my invention to the use of reactance tubes including the reactance amplifying effect disclosed in this application. Obviously reactive circuits as illustrated in Fig. 8 may be used to phase modulate wave energy within the spirit of my invention. In this circuit the reactance tube 140 has a grid electrode, that adjacent plate 142, and its cathode 144 connected to a source of controlling or modulating potentials 145. The reactance or output of the tube 140 is connected in shunt to the tuned circuit TC of a carrier wave amplifier 148. The anode 150 of this tube also is connected by a coupling condenser 151 and phase shifting resistance R1 and phase shifting condenser C1 to the control grid 152 and cathode 144. The reactive effects produced between the anode and cathode of tube 140 tune the circuit TC to modulate the phase of the wave energy supplied from the carrier wave source 156 to the control grid 153 and cathode 155 of amplifier tube 148. The phase modulated wave energy is supplied to any utilization circuit which may include frequency multipliers, limiters, etc., as shown.

What is claimed is:

1. In a frequency modulation system an electron discharge tube generator having electrodes coupled by a circuit including parallel inductance and capacity for the production of oscillatory electrical voltages to be modulated in frequency, and means for modulating the frequency of the said produced voltages at signal frequency comprising a pair of electron discharge systems each having an electron emission element, an anode and a control electrode, means coupling said anodes to said circuit to apply voltages of the frequency of operation of said generator to said anodes, a second circuit including parallel inductance and capacity connected to the control electrodes of said discharge systems, said last named inductance being coupled to said first named inductance to apply voltages of the frequency of operation of said generator from said first named inductance to said control electrodes of phases such that a substantially phase quadrature relation between the voltages on the anode and control electrode of each discharge system is established, whereby a reactive effect is produced in said systems and effectively tunes said circuit to thereby determine the frequency of the oscillatory voltages produced, and means for controlling the gain of each of said systems at signal frequency to thereby modulate the frequency of the produced oscillatory voltages at signal frequency.

2. In a frequency modulation system an oscillation generator comprising an electron discharge device having its electrodes connected in oscillation generating circuits including an inductive reactance, and means for modulating the frequency of the oscillations generated comprising a pair of electron discharge tubes each having a plurality of control electrodes, an anode and a cathode, a tuned circuit coupled between corresponding control electrodes in said tubes and coupled to the inductive reactance of said oscillation generating circuits to feed generated oscillations to said control electrodes, couplings between the cathodes of said tubes and said tuned circuit and said oscillation generating circuits, a coupling between the anodes of said tubes and the oscillation generating circuits to feed generated oscillations to said anodes, said couplings being such that the oscillations on the anode and control electrode of each tube are displaced in phase about 90 degrees, and means for modulating the potential on other corresponding control electrodes of said last named pair of tubes in phase opposition at signal frequency.

3. In a wavelength modulation system, an electron discharge device having its electrodes connected in high frequency circuits including a first inductive reactance wherein high frequency energy flows, and means for modulating the wavelength of the high frequency wave energy flowing in said circuit comprising, a pair of electron discharge devices each having an anode, a cathode and a control grid, a tuned circuit including a second inductive reactance coupling the control grids of said tubes in push-pull relation, said second named inductive reactance being coupled to said first named inductive reactance whereby high frequency voltage is transferred from said first named inductive reactance to said second named inductive reactance and applied to said control grids in push-pull relation, a connection between the anodes of said tubes and a point on said first named inductive reactance, a connection between the cathodes of said tubes and a second point on said first named inductive reactance, a source of modulating potentials, and means controlled by modulating potentials from said source of modulating potentials for controlling the impedances of said tubes substantially in opposition at modulation frequency.

4. In a frequency modulation system an oscillation generator comprising an electron discharge device having its electrodes connected in oscillation generating circuits including an inductive reactance, and means for modulating the frequency of the oscillations generated comprising a pair of electron discharge tubes each having a control electrode, an anode and a cathode, a tuned circuit connected between the control electrodes in said tubes and coupled to the inductive reactance of said oscillation generating circuits to feed oscillations from said generating circuits to said control electrodes substantially in phase opposition, a connection between the cathodes of said tubes and said oscillation generating circuits, a connection between the anodes of said tubes and the oscillation generating circuits to feed generated oscillations to said anodes, said coupling and connections being such that the oscillations on the anode and control electrode of each tube are displaced in phase about 90 degrees, and means for controlling the impedances of said last named pair of tubes in phase opposition at signal frequency.

5. In a wavelength modulation system, an electron discharge device having its electrodes connected in high frequency circuits including a first inductive reactance wherein high frequency energy flows, and means for modulating the wavelength of the high frequency wave energy flowing in said circuit comprising, a pair of electron discharge devices each having an anode, a cathode and a control grid, a tuned circuit including a second inductive reactance coupling the control grids of said tubes in push-pull relation, said last named inductive reactance being inductively coupled to said first named inductive reactance whereby high frequency voltage is transferred from said first inductive reactance to said second named inductive reactance and applied to said control grids in push-pull relation, a connection between the anodes of said tubes and a point on said first named inductive reactance, a connection between the cathodes of said tubes and a second point on said first named inductive reactance, a source of modulating potentials, and means controlled by potentials from said source of modulating potentials for varying the conductivity of said tubes substantially in phase opposed relation to thereby modulate the length of the high frequency wave energy flowing in said first inductive reactance at modulation potential frequency.

6. A wave length modulation system comprising a first tuned circuit including an inductance and a condenser in parallel, an electron discharge device having a grid, an anode and a cathode regeneratively connected to said first tuned circuit whereby high frequency oscillations are generated by said device and circuit, a pair of reactance tube systems each having electrodes including electron emitting means, an electron flow control electrode and an electron receiving electrode, a second tuned circuit comprising an inductance and a capacity in parallel connected between said control electrodes, said two tuned circuits being inductively coupled together, means tying the electron emitting means of said tubes together and coupling the same to a point on said first tuned circuit, a connection connecting said electron receiving electrodes together and to said first named parallel tuned circuit, and means for varying the conductivity of the reactance tube systems to thereby vary the effective tuning of said first named circuit and the length of the oscillations generated in said device and circuit.

7. In a wave length modulation system, a first circuit comprising an inductance and a capacity in parallel, means for causing high frequency wave energy the wave length of which is to be modulated to flow in said circuit, and means for modulating the wave length of the high frequency wave energy flowing in said circuit comprising a pair of electron discharge devices each having an anode, a cathode and a control grid electrode, a coupling between the cathodes of each of said devices and a point on said inductance of said first circuit, a connection connecting the anodes of said devices substantially directly together and to a terminal of said inductance of said first circuit, a second inductance and a condenser in parallel tuned substantially to the frequency of the high frequency wave energy caused to flow in said first circuit, said first and second inductances being inductively coupled together, a second circuit including said second named inductance and condenser in parallel connecting the control grids of said devices in push-pull relation to excite the said control grids by high frequency voltages of substantially opposed phase, and means for modulating the impedances of said devices in opposed relation in accordance with modulating potentials.

MURRAY G. CROSBY.